(12) United States Patent
Stencel

(10) Patent No.: US 9,197,050 B2
(45) Date of Patent: Nov. 24, 2015

(54) END-FITTING FOR ROUTING CABLES WITHIN VEHICLES

(71) Applicant: FORD GLOBAL TECHNOLOGIES, LLC, Dearborn, MI (US)

(72) Inventor: Jacob Peter Stencel, Casco Township, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 107 days.

(21) Appl. No.: 14/013,051

(22) Filed: Aug. 29, 2013

(65) Prior Publication Data

US 2015/0059124 A1 Mar. 5, 2015

(51) Int. Cl.
*H02G 3/22* (2006.01)
*F16C 1/10* (2006.01)
*F16C 1/26* (2006.01)

(52) U.S. Cl.
CPC ........ *H02G 3/22* (2013.01); *F16C 1/102* (2013.01); *F16C 1/262* (2013.01)

(58) Field of Classification Search
CPC ............. H02G 3/00; H02G 3/02; H02G 3/04; H02G 3/06; H02G 3/0616; H02G 3/22; H02G 3/24; H02G 3/28; H02G 3/30; H02G 3/36; H02G 15/00; H02G 15/013; H02G 15/007; H02G 15/04; B60R 16/0207; B60R 16/0222

USPC ............... 174/481, 650, 654, 659, 68.1, 68.3, 174/72 A, 73.1, 74 R, 84 R, 70 C, 152 G, 174/153 G; 248/49, 68.1, 73, 74.1, 74.2, 56; 74/502.4; 16/2.1, 2.2
See application file for complete search history.

(56) References Cited

U.S. PATENT DOCUMENTS

| | | | | |
|---|---|---|---|---|
| 3,913,956 A * | 10/1975 | Eidelberg et al. | ............ | 174/77 R |
| 4,145,075 A * | 3/1979 | Holzmann | ............... | 285/81 |
| 7,201,081 B2 * | 4/2007 | Mossler | ............... | 74/502.4 |
| 7,369,381 B2 * | 5/2008 | Tsukamoto et al. | ....... | 174/72 A |
| 7,390,969 B2 * | 6/2008 | Fraley et al. | ............ | 174/72 A |
| 7,422,181 B2 * | 9/2008 | SuBenbach | ................. | 248/56 |
| 7,973,250 B2 * | 7/2011 | Groeller et al. | ........... | 174/481 |
| 8,742,257 B2 * | 6/2014 | Uda et al. | ................. | 174/74 R |

* cited by examiner

*Primary Examiner* — Angel R Estrada
(74) *Attorney, Agent, or Firm* — Joseph E. Root

(57) ABSTRACT

An end-fitting assembly for routing a cable on a vehicle chassis in a predetermined direction. The assembly includes a mounting element and end-fitting element. The mounting element includes a mounting portion, attached to the vehicle chassis, and a flange portion, having a mounting aperture with a keyway formed in the mounting aperture periphery. The end-fitting element is generally tubular in form and sized to engage the mounting aperture, and it includes a retainer element on the end-fitting, adapted to engage the mounting aperture; a locking assembly, including a key adapted to engage the keyway; and a directional tube, extending from the mounting element in the pre-determined direction, adapted to carry the cable.

12 Claims, 3 Drawing Sheets

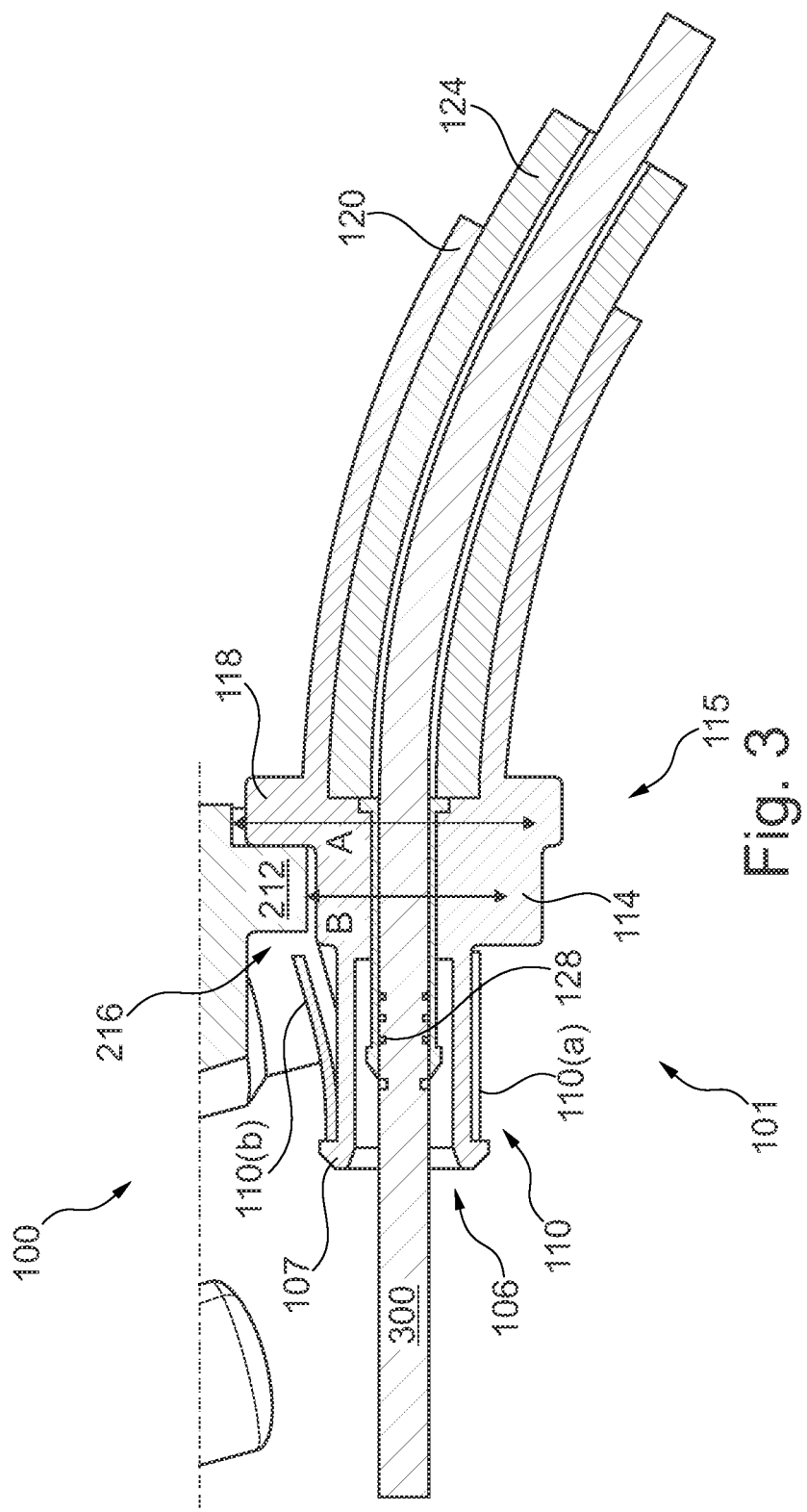

END-FITTING FOR ROUTING CABLES WITHIN VEHICLES

TECHNICAL FIELD

Embodiments of the present disclosure generally relate to routing cables within vehicles, and, more specifically, to structures for routing cables on a vehicle chassis.

BACKGROUND

Cable assemblies are employed to perform a variety of functions on automotive vehicles, such as parking brakes, tire carriers, window regulators and the like. Such cables need to be routed through the available space between the components, to mechanically couple those components.

Conventionally, routing a cable in a specific direction within a vehicle requires a special kind of end-fitting. A fastener holds the end-fitting in place, and a bent tube connected to the end-fitting receives the cable and routes it in the intended direction. Generally, connecting the tube to the end-fitting is accomplished in a stamping process, which can alter the direction in which the cable is routed, complicating the eventual routing process. Also, the complicated nature of conventional end-fitting assemblies results in expensive components. In addition, conventional end-fittings require fasteners, resulting in a cumbersome assembly exercise, often requiring considerable time and effort Considering the problems mentioned above, and other shortcomings in the art, there exists a need for a more effective and efficient structure for routing cables within automotive vehicles.

SUMMARY

One aspect of the present disclosure is a device for routing a cable on a vehicle chassis in a predetermined direction. The device includes a mounting element and end-fitting element. The mounting element includes a mounting portion, attached to the vehicle chassis, and a flange portion, having a mounting aperture with a keyway formed in the mounting aperture periphery. The end-fitting element is generally tubular in form and sized to engage the mounting aperture, and it includes a retainer element on the end-fitting, adapted to engage the mounting aperture; a locking assembly, including a key adapted to engage the keyway; and a directional tube, extending from the mounting element in the pre-determined direction, adapted to carry the cable.

Additional aspects, advantages, features and objects of the present disclosure would be made apparent from the drawings and the detailed description of the illustrative embodiments construed in conjunction with the appended claims that follow.

BRIEF DESCRIPTION OF THE DRAWINGS

FIG. 3 is a sectional view of an end-fitting assembly, taken along plane A-A of FIG. 1

DETAILED DESCRIPTION OF ILLUSTRATIVE EMBODIMENTS

Figure 1:
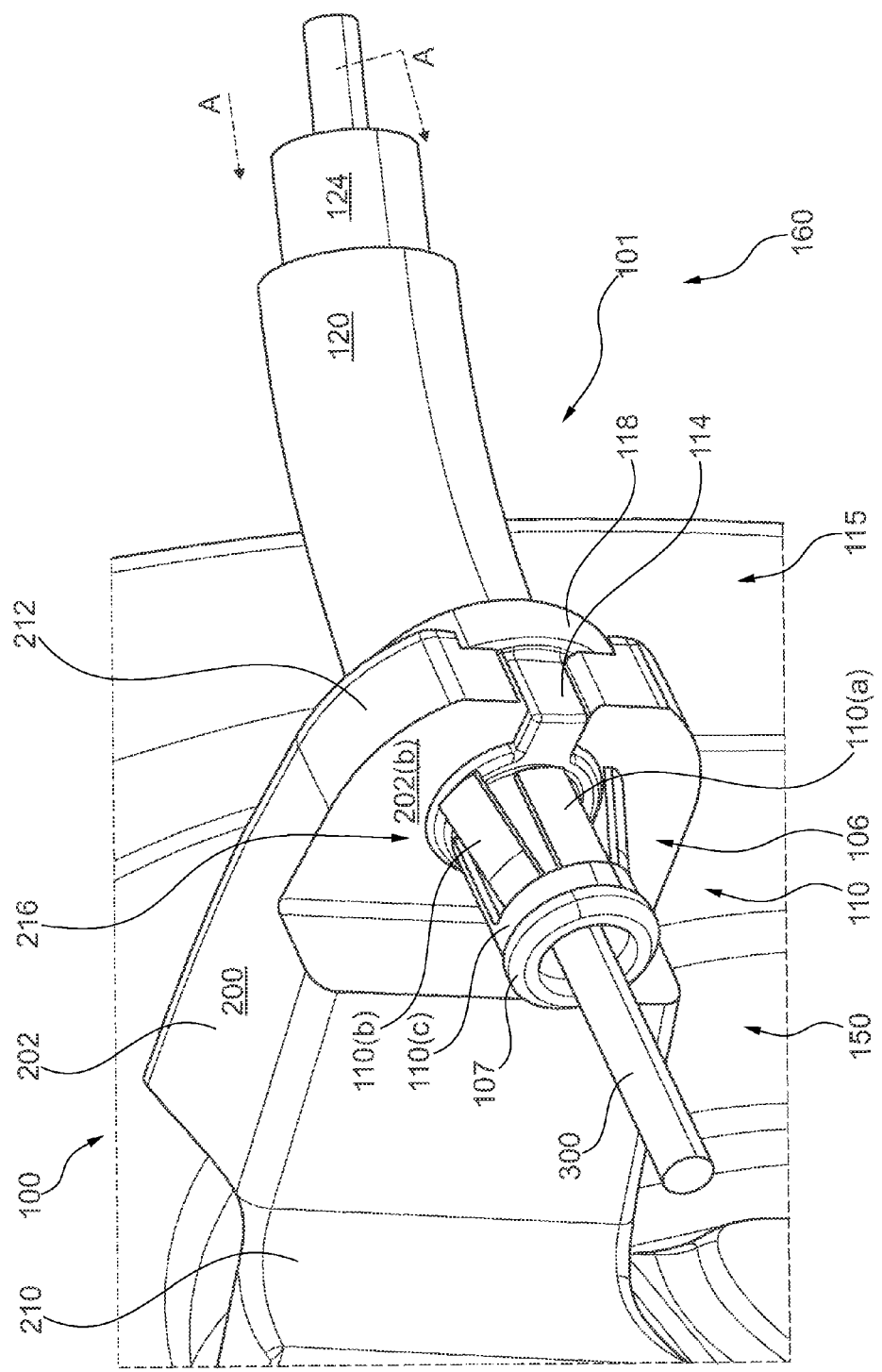
FIG. 1 is a perspective view of an end-fitting assembly configured to carry and route a cable, according to an embodiment of the present disclosure.

The following detailed description illustrates aspects of the disclosure and its implementation. This description should not be understood as defining or limiting the scope of the present disclosure, however, such definition or limitation being solely contained in the claims appended thereto. Although the best mode of carrying out the invention has been disclosed, those in the art could recognize other possible embodiments for carrying out or practicing the invention Overview End-fitting assemblies assist in routing cables between points on a vehicle chassis. Such cables may provide connections between different components of a vehicular system/subsystem, such as a window regulator or a parking brake. The end-fitting assembly should be securely mounted, preventing any movement.

This disclosure provides an end-fitting assembly attachable to a vehicle chassis, for routing cable(s) from point to point on the chassis. The assembly generally includes a mounting element, attached to the chassis, and an end-fitting element, which easily locks to the mounting element. The mounting element and the end-fitting are formed to engage so that the completed assembly is securely fixed in place, precluding both longitudinal and rotational motion. No fasteners are required to secure the end-fitting element to the mounting element, allowing rapid and reliable assembly. Also, the end-fitting element is formed to guide the cable in the required direction across the chassis.

In general terms, end-fitting assembly 100 includes an end-fitting element 101 and a mounting element 200, which support and guide cable 300 from point to point on the chassis. The mounting element 200 is attached to the chassis, and it includes a mounting portion 210 and a flange portion 202. End-fitting element 101 engages mounting element 200, and it includes a retainer element 106, for longitudinal control; a locking assembly 115, for rotational control; and a directional tube 120, for orienting the cable 300 in the desired direction. For clarity of description, the end of end-fitting element 101 lying at the left side of FIG. 1 will be referred to below as the working end 150 and the opposite end will be referred to as the input end 160. The directions "front" and "rear" will be understood as referring to the working and input ends 150, 160, respectively.

Exemplary Embodiments

Figure 2:
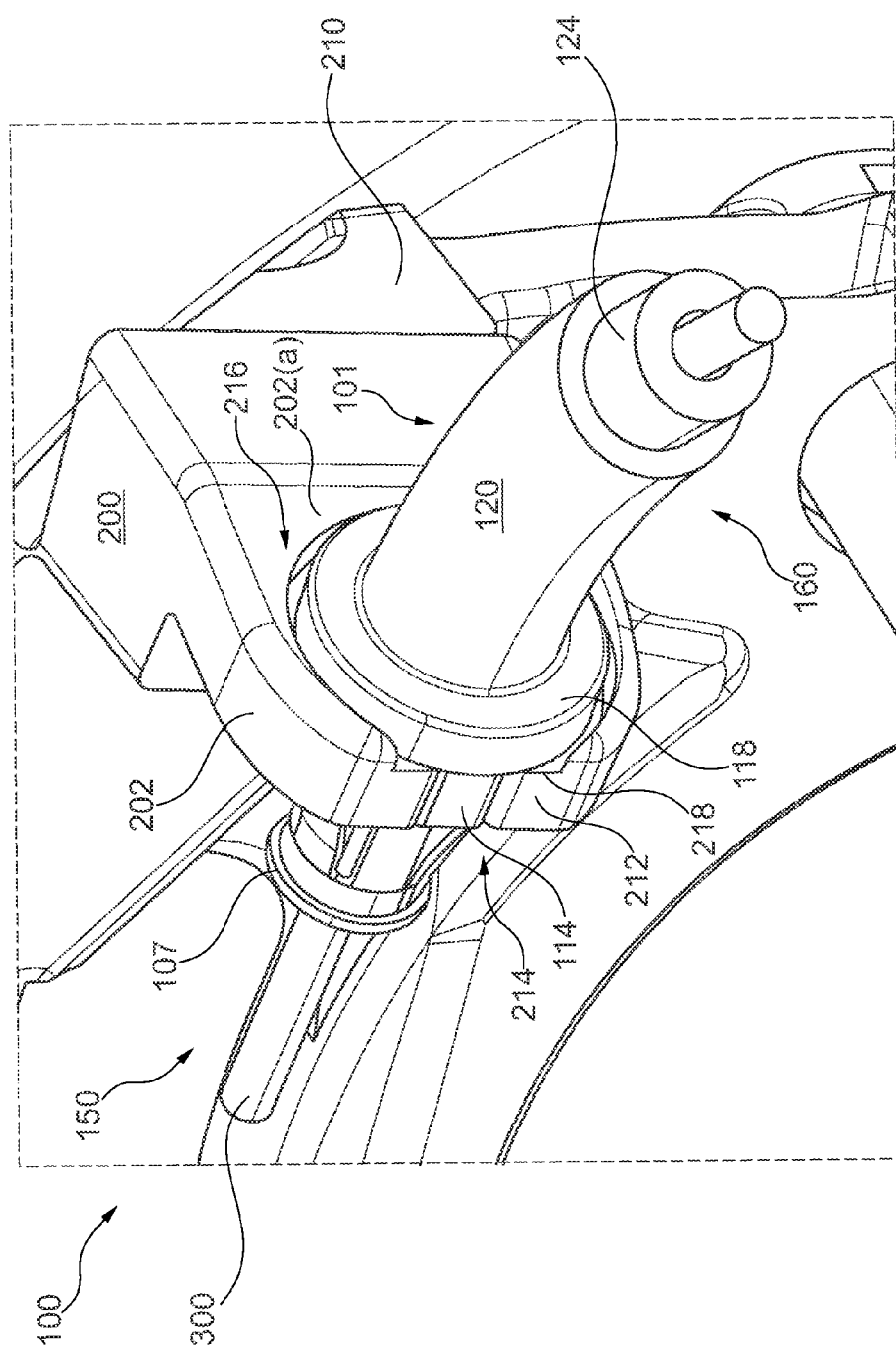
FIG. 2 is a perspective view of the end-fitting assembly of FIG. 1, taken from the opposite side of the assembly, according to the present disclosure.

FIGS. 1 and 2 are perspective views of an end-fitting assembly 100. FIG. 1 is taken from a point of view on the working end of end-fitting assembly 100, and FIG. 2 views end-fitting assembly 100 from a point of view looking at the input and. These two figures will not be described separately, but rather the reader can best understand the structure by applying the description to figures. In addition, it should be understood that FIGS. 1 and 2 do not depict the inner portions of either end-fitting element 101 or mounting element 200; those structures are discussed in detail in connection with FIG. 3.

Retainer element 106 is a generally tubular structure at the working end of end-fitting element 101. This element serves to lock the end-fitting element 101 to mounting element 200. The locking action is performed by retainer 110, which includes multiple rectangular strips 110(*a*), 110(*b*), extending longitudinally rearward from a ring shaped portion 110(*c*), disposed adjacent the working end 150. Flat strips 110(*a*) are completely flat, lying against the surface of end-fitting element 101, while locking strips 110(*b*) are biased outward from that surface. In the illustrated embodiment, three flat strips 110(*a*) are provided, as are three locking strips 110(*b*). Those of skill in the art will understand that alternative members of the various types of scripts can be provided. The tip of retainer element 106 carries a retainer ridge 107, which serves to hold retainer 110 in position. The engagement of the retainer element 106 with the mounting element 200 will be clearer in the description that follows, as well as the discussion accompanying FIG. 3.

Retainer 110 may be formed from a polymer plastic material, sufficiently resilient to allow the locking strips 110(*b*) to flex. In addition to the illustrated embodiment, a number of possible variations may be contemplated will also. Those in the art will be able to envision a number of different structures to perform the stated function. For example, an alternative embodiment could include a detent structure, in which positioning elements on the end-fitting element 101 engage grooves or other recesses formed into the interior of the mounting element. This structure, or a number of alternatives, could be provided.

The end-fitting element 101 includes a locking assembly 115, configured to prevent the rotation of the end-fitting element with respect to the mounting element 200. The locking assembly includes a key 114 and a positioning ring 118 located adjacent the key on the input side. The key 114 is a protrusion sized and adapted to fit into a keyway in the mounting element 200, as explained in greater detail below. Though shown as having a rectangular profile, the key 114 may be formed in other shapes, such as a rounded or circular protrusion, as known by those in the art.

The positioning ring 118 is an annular member extending outward from the body of end-fitting element 101, adjacent to and on the input side of key 114. This member is sized to engage the mounting element 200, as discussed below. The illustrated embodiment takes the form of an annulus, but other embodiments could take alternate forms, such as a number of projections, or an annulus that extends outward sufficiently to locate the end-fitting element but not to the entire extent of the mounting element walls.

The input side of the end-fitting element 101 includes a directional tube 120 extending from the positioning ring 118 toward input end 160. This tube extends longitudinally, and it is adapted to carry the cable 300. The length of tube 120 is selected based on the surrounding elements through which the cable is being routed. For example, a cable running in the vicinity of the drive shaft may benefit from a tube having sufficient length to preclude any contact between the cable and the drive shaft. Further, the tube 120 is bent in a direction chosen to direct the cable toward its destination on the chassis. In this manner, the cable may proceed toward the intended destination.

A conduit 124 is carried within tube 120, providing a snug fit for cable 300. The size and shape of the directional tube 120, as well as the dimension and sizing of conduit 124, depend on the dimensions of the cable 300. For ease of assembly, it is helpful if conduit 124 fits snugly but smoothly inside of directional tube 120. Similarly, the inner diameter of conduit 124 should snugly but smoothly accept cable 300.

Any suitable polymer plastic, metal, or metallic alloy can be used to form the end-fitting element 101. In the illustrated embodiment, end-fitting element 101 is a casting, employing cast zinc or a soft steel, such as type 1010-1020. In other embodiments, a plastic structure, for example, could be formed by molding.

Mounting element 200, which accommodates and engages end-fitting element 101, employs a flange portion 202 and a mounting portion 210. The point at which the mounting element 200 attaches to the chassis depends entirely upon the routing requirements of cable 300 in a given application, but in general those of skill in the art will be able to select a suitable point at which to provide a mounting point.

Mounting portion 210 attaches to the chassis by any suitable means, such as a nut and bolt assembly or by welding. Alternatively, mounting portion 210 may be formed as a portion of some other element of the chassis. Here, for example, mounting portion 210 is located in the vicinity of a vehicle rear wheel, and here it is convenient to form mounting portion 210 integral with the wheel bearing casting (not shown). Those of skill in the art will be able to identify suitable fastening locations and suitable fastening means.

Flange portion 202 is a generally planar element, extending from mounting portion 210 to a position intersecting the desired path of cable 300. The two planar surfaces 202 (*a*) and 202 (*b*) a flange portion 202 should be formed or machined so that when they are installed so that they lie perpendicular to the path of end-fitting 101 where it passes through flange portion 202. A mounting aperture 216 extends through flange portion 202, and a keyway 214 extends completely from the mounting aperture 216 through the entirety of flange portion 202, leaving two positioning arms 212 surrounding the mounting aperture 216, the tips of the two arms being separated by keyway 214. In the illustrated embodiment, flange portion 202 has one surface 202 (*b*) machined down to a smaller dimension than that of mounting portion 210. Those of skill in the art will understand that a number of design choices could be implemented here, consonant with the requirements set out above.

Mounting aperture 216 is formed with two diameters, as discussed more fully in connection with FIG. 3. A first diameter (diameter A in FIG. 3), best seen in FIG. 2, is sized to accept positioning ring 118, and that diameter extends a selected distance into flange portion 202, terminating in a step 218. A second diameter (diameter B in FIG. 3), extends the remaining distance through flange portion 202, as best seen in FIG. 1. That diameter is sized to accept retaining element 106.

FIG. 3 is a sectional view of the end-fitting assembly 100, showing the end-fitting element 101 engaging the mounting tube 206 of the mounting element 200. This view is taken along plane A-A of FIG. 1, the central horizontal plane passing through end-fitting assembly 100.

Clearly visible in this field is the point that end-fitting assembly 100 has different exterior and interior dimensions in each of its three sections. Turning first to mounting element 200, diameter A and diameter B, explained above, are clearly shown. Retaining element 106, at the left-hand portion of FIG. 3, has an exterior dimension sized to fit easily into mounting element diameter B. Discussion of the operation of retaining element 100 is set out below.

The base portion of locking assembly 115 is sized to fit smoothly but snugly into diameter B, while positioning ring 118 fits into the portion of mounting aperture 216 having diameter A. The drawing illustrates key 114 as inserted into keyway 214 (FIGS. 1, 2). An elastomeric seal 128 is carried on the interior walls of locking assembly 115, sized and formed to provide a watertight seal for cable 300. Seal 128 may extend into the interior of retaining element 106. Two assist in retaining seal 128 in position, the portion of that element designed to fit at the intersection of locking element 115 and directional tube 120 may be formed into a ring-like portion having a slightly larger diameter than the remainder of seal 128, and a corresponding recess may be formed in the interior wall of locking assembly 115. In this manner, pressure against the ring-like portion can serve to retain seal 128 in position.

The interior of directional tube 120 is sized to accept conduit 124, which is carried within that interior with the conduit making contact with the ring-like portion of seal 128 and the end of the interior portion of directional tube 120. Conduit 124 may be formed of a flexible, elastomeric material, adapted to fit within whatever curve may be needed to describe the direction of directional tube 120. The interior of conduit 124 is dimensioned to carry the cable 300, allowing that element to move freely.

The structure of retaining element 106 as discussed above, and its manner of operation can be clearly seen here. End-fitting element 101 is mounted on mounting element 200 by inserting retaining element 106 into mounting aperture 216. During that insertion, the locking strips 110(b) make contact with positioning arms 212 and flex inward. When those strips pass the edge of the positioning arms 212, the snap outward, creating a snap fit. In that manner, retaining element 106 prevents longitudinal movement of end-fitting element 101. An operator can easily disassemble this element, however, by simply pressing in the three locking strips 110(b) and pushing the end-fitting element 101 out of engagement with mounting element 200.

The disclosed end-fitting element assembly can be used to facilitate routing cables through the chassis of a vehicle. Typical systems requiring such cables include parking brake, power steering unit, window regulator, and the like. Also, though described in context of a vehicle, the claimed end-fitting assembly may also be used generically, in any other suitable environment where cable routing is required. Further, the described shapes, structures and dimensions of the different components of the assembly are only exemplary, and appropriate variations of the same may also be contemplated in certain embodiments.

Although the current invention has been described comprehensively, in considerable details to cover the possible aspects and embodiments, those skilled in the art will recognize that other versions of the invention are also possible.

What is claimed is:

1. A device for routing a cable on a vehicle chassis in a predetermined direction, the device comprising:
    a mounting element attached to the vehicle chassis, including a flange portion, having a mounting aperture with a keyway formed in the mounting aperture periphery;
    an end-fitting element, generally tubular in form and sized to engage the mounting aperture, the end-fitting including:
        a retainer element on the end-fitting, adapted to engage the mounting aperture, the retainer element including one or more flat strips, lying on the surface of the retainer element, and one or more locking strips, having one end at the surface of the retainer element and a second end biased away from the surface of the retainer element;
        a locking assembly, including a key adapted to engage the keyway; and
        a directional tube, extending from the mounting element in the pre-determined direction, adapted to carry the cable.

2. The device of claim 1, wherein the mounting aperture is integrally formed with a portion of the chassis.

3. The device of claim 1, wherein the mounting aperture is integrally formed with a component of the vehicle attached to the chassis.

4. The device of claim 1, wherein the mounting aperture is defined by a pair of positioning arms, the tips of the positioning arms being separated to define the keyway.

5. The device of claim 1, wherein the retainer element snap-fits into the mounting aperture.

6. The device of claim 1, wherein the locking assembly further includes a positioning ring, and the mounting aperture includes a first portion, sized to accept the retaining element, and a second portion, sized to accept the positioning ring.

7. The device of claim 1, wherein the locking assembly further includes a seal, carried on an interior surface of the locking element and adapted to provide a watertight seal between the locking assembly and the cable.

8. The device of claim 1, wherein the interior diameter of the locking assembly is dimensioned to accept the cable and the seal.

9. The device of claim 1, wherein the end-fitting is a unitary structure formed by casting.

10. A device for routing a cable on a vehicle chassis in a predetermined direction, the device comprising:
    a mounting element integrally formed with a component of the vehicle attached to the chassis, including a flange portion, having a pair of positioning arms defining a mounting aperture, the tips of the positioning arms being separated to define a keyway, the mounting aperture having two longitudinally spaced portions having a first diameter and a second diameter;
    an end-fitting element, generally tubular in form and sized to engage the mounting aperture, the end-fitting including:
        a retainer element on the end-fitting, sized for acceptance into the mounting aperture second diameter, and including a retainer having one or more flat strips, lying on the surface of the retainer element, and one or more locking strips, having one end at the surface of the retainer element and a second end biased away from the surface of the retainer element, for engaging the mounting aperture;
        a locking assembly, including
            a key adapted to engage the keyway; and
            a positioning ring, sized for acceptance into the mounting aperture first diameter; and
        a directional tube, extending from the mounting element in the pre-determined direction, including a conduit carried within the directional tube and adapted to carry the cable.

11. The device of claim 10, wherein the locking assembly further includes a seal, carried on an interior surface of the locking element and adapted to provide a watertight seal between the locking assembly and the cable.

12. The device of claim 10, wherein the interior diameter of the locking assembly is dimensioned to accept the cable and the seal.

* * * * *